April 22, 1941.  H. W. SEIGER  2,239,576
HINGE RECESS GAUGE
Filed Feb. 28, 1940  2 Sheets-Sheet 1
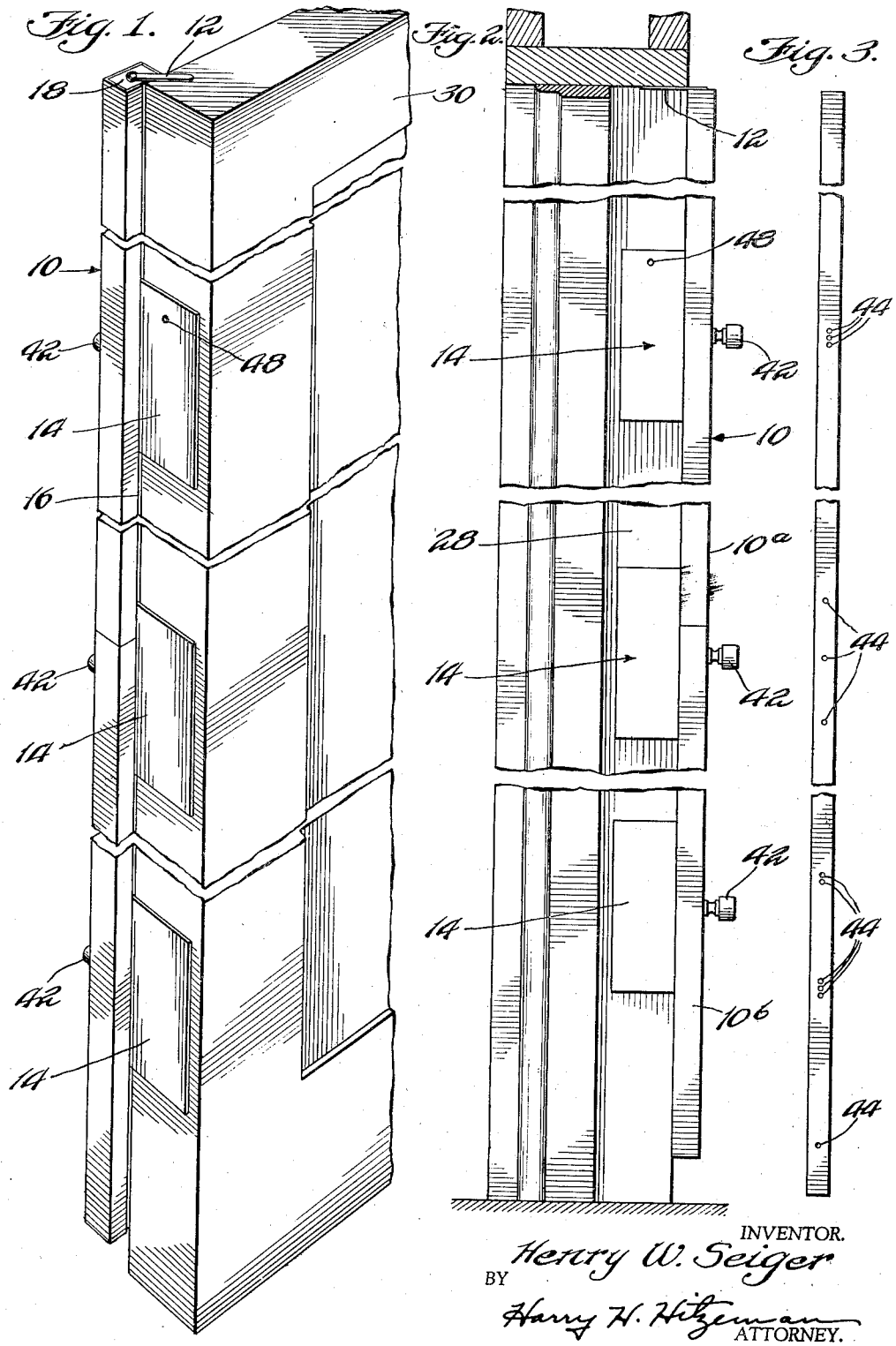
INVENTOR.
Henry W. Seiger
BY Harry H. Hitzeman
ATTORNEY.

April 22, 1941.    H. W. SEIGER    2,239,576
HINGE RECESS GAUGE
Filed Feb. 28, 1940    2 Sheets-Sheet 2
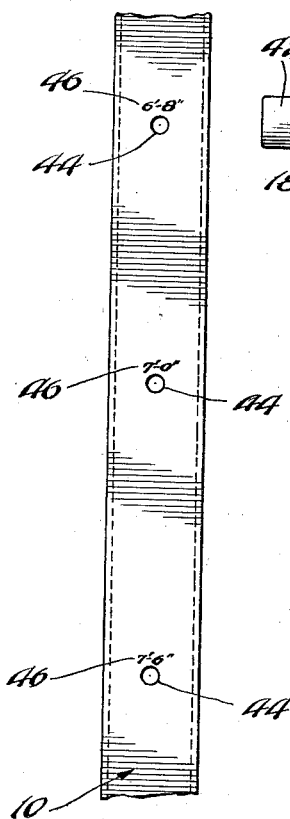
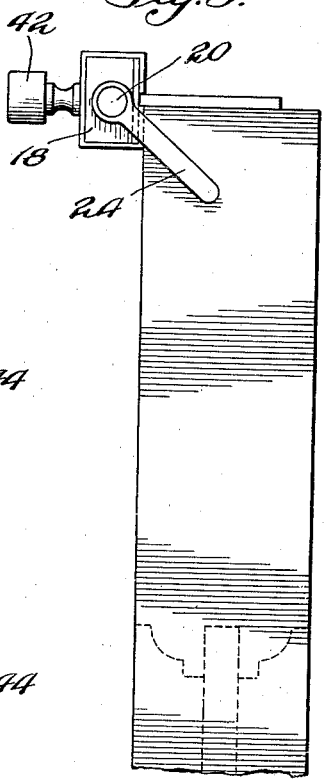
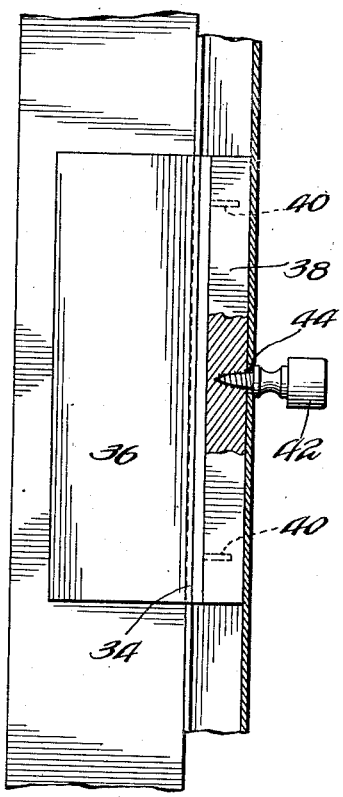
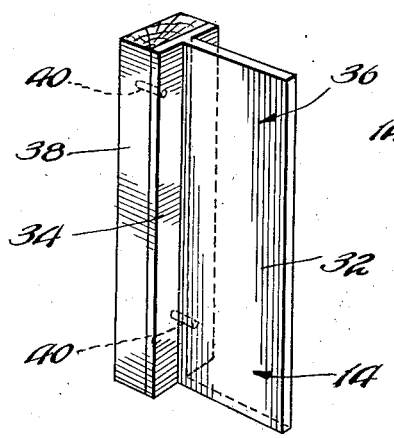
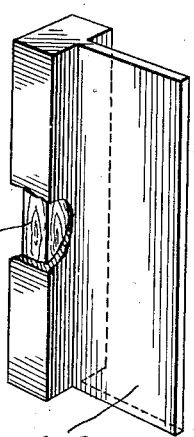
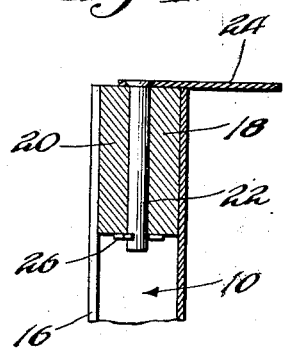
INVENTOR.
Henry W. Seiger
BY Harry H. Hitzeman
ATTORNEY.

Patented Apr. 22, 1941

2,239,576

UNITED STATES PATENT OFFICE 2,239,576

HINGE RECESS GAUGE

Henry W. Seiger, Elgin, Ill.

Application February 28, 1940, Serial No. 321,285

8 Claims. (Cl. 33—197)

My invention relates to improvements in hinge recess gauges and similar devices.

My invention relates more particularly to a gauge for carpenters for accurately and easily locating and marking upon doors, windows or other closure members, and upon door or window sills or jambs the exact outline for the hinge or other fastening member.

The principal object of my invention is to provide an improved hinge recess gauge that is sufficiently simple in operation so that the average individual can use and operate the same to accurately and quickly mark upon doors or sills the exact location of the hinge plates.

A further object of my invention is to provide a gauge of the character described having adjustable templates or gauge plates so that the same device may be utilized for marking hinge plate locations upon any one of a number of the standard door sizes being commercially used today.

A further object of my invention is to provide a device of the character described that is so constructed that its accuracy will not be impaired either by continuous usage or infrequent usage.

A further object of my invention is to provide a device of the character described constructed of a minimum of parts, easily and cheaply assembled or disassembled, yet sufficiently durable so that it will withstand rough handling or frequent usage and will not become broken or out of order.

A further object of my invention is to provide in a device of the character described movable templates or gauge plates of a specific size for different sized doors and locating openings in the template holder with visible indicia at the openings so that a user may easily and quickly position the template at the required positions.

Other objects and advantages will be more apparent from the following description wherein reference is had to the accompanying two sheets of drawings, upon which Fig. 1 is a fragmentary foreshortened perspective view showing my improved gauge as applied in use to the edge of a door for locating hinges thereon;

Fig. 2 is a side elevational view of the hinge gauge showing the same as applied to a door casing for use in locating hinges thereon;

Fig. 3 is a rear elevational view of the tubular member;

Fig. 4 is a full size cross sectional view of the upper end of the tubular member showing the plug and clearance marking arm;

Fig. 5 is a plan view of the same as applied to a door;

Fig. 6 is a fragmentary cross sectional view through the tube and one of the templates;

Fig. 7 is a view in perspective of one form of template which I employ;

Fig. 8 is a similar perspective view of another form of template; and

Fig. 9 is an enlarged fragmentary view of a portion of the tube showing one of the sets of locating holes and the indicia applied to the same.

In the embodiment of the invention which I have chosen to illustrate, I have shown a hinge gauge comprising generally the tubular member 10, clearance arm 12 secured to the upper end of the same, and a plurality of templates 14. The tubular member 10 may be rectangular in cross section and be provided upon one of its long sides with medially disposed slot 16 extending from the top to the lower end of the tube.

The upper end of the tube may be closed by a plug member 18 which has a vertical hole 20 drilled through its entire length. I position a metal shaft insert 22 in the opening 20 provided at its upper end with a swinging arm member 24. The shaft 20 may extend through the plug and have an opening drilled through the same adjacent the lower edge of the plug 18 through which a cotter pin 26 is inserted. This arrangement prevents any movement of the shaft endwise, and will tend to hold it in its original position. This is important as it is necessary to prevent any movement either up or down of the arm 24, thereby insuring both the exact markings for the hinge recesses, and also the amount of clearance between the upper end of a door and the top of the door opening.

I provide the templates 14 for marking the outline of the recess to be made for the hinge members upon either the door jamb 28 or the edge of the door 30. The template members 14 may be formed of a T-shaped member 32 having a back wall portion 34 and a leg 36. I provide a wooden backing plate or filler 38 which may be held in position upon the template by suitable extensions 40 which are a part of the T castings and which extend through small holes drilled through the backing plate 38. The filler and backing plate will be of proper size to fill the entire inner area of the tube and the T members can thus be slid up and down in the tubular member. The leg 36 of the template may be of various sizes to accommodate different sized doors, windows or other members which it is desired to mark for hinge plates.

In use, the template may be held in a desired position in the tubular member 10 by a thumb screw member 42 which may extend through a locating opening 44 in the back of the tube 10.

As shown in Fig. 3, I have provided a plurality of marking openings 44 for the upper, intermediate, and lower hinges, and as shown in Fig. 9, I have placed the indicia 46 adjacent different holes so that the operator may locate the template in the desired opening for certain size doors or windows.

In using my improved hinge recess gauge, the same is applied to either a door or a door opening as shown in Figs. 1 and 2, and the outline of the leg 36 is marked upon the door or the door opening. It will be noted that I have shown the tubular member 10 as two sections, 10a and 10b, so that the same may be separated for packing and when not in use. The two sections will be firmly held together by the intermediate template 14 which will extend into both of the sections.

Inasmuch as the lower end of the gauge does not rest upon the floor or the sill, the uniformity of distance or clearance between the top of the door and the head of the door frame or jamb head is obtained by applying the gauge to the edge of the frame or jamb and holding it firmly in position with the upper end or top side of the swinging arm 24 pressed against the lower side of the jamb head, and the front or slotted side of the tubular member 10 pressed against the vertical edge of the jamb. I provide a small drilled hole 48 in the upper template 14 so that a small nail may be driven into the side of the door jamb for holding the gauge in place and supporting it in proper position while the outlines of the template are marked. Inasmuch as the template marking legs 36 extend outwardly from the slot 16 which is in the exact center of the tube, the gauge may be applied to either right or left hand swinging doors and the method of application and its operation will be the same in either case.

From the above and foregoing description, it will be apparent to those skilled in the art that I have provided a simple, economical and accurate marking gauge for use in connection with the hanging of doors of all kinds, including interior doors, screens, storm doors, casement or swinging windows. By providing different size templates and different locating openings 44 in the tubular member 10, it will be apparent that accurate precision work can be done in an easy and simple manner upon any size closure member and the associated opening. By the use of my gauge many unnecessary movements and lost motion will be eliminated, such as measuring by rule and locating the recesses for hinges, setting the door in place and plugging it up from the bottom in order to get the right clearance at the top of the door.

While I have illustrated and described a specific embodiment of my invention, it will be apparent to those skilled in the art that changes and modifications can be made in the exact details shown, and I do not wish to be limited in any particular; rather what I desire to secure and protect by Letters Patent of the United States is:

1. A hinge recess gauge comprising a rectangularly shaped tubular member having a slot medially down its front side, a plug in its upper end, a rotatable arm of a specified thickness mounted on said plug above the end of said tubular member at right angles thereto, a plurality of T-shaped templates positioned in said tubular member with a leg projecting through the slot therein and a fastening member adapted to extend through a hole in the rear side of said member for each of said templates, said holes being positioned to place the projecting portion of said templates in the exact location of hinge door recesses.

2. A hinge recess gauge comprising a tubular member having a slot medially down its front side, a plug in its upper end, a rotatable arm of a specified thickness mounted on said plug above the end of said tubular member at right angles thereto, a plurality of T-shaped templates positioned in said tubular member with a leg projecting through the slot therein and a fastening member adapted to extend through a hole in the rear side of said member for each of said templates, said holes being positioned to place the projecting portion of said templates in the exact location of hinge door recesses.

3. A hinge recess gauge comprising a hollow rigid member having a slot down one side, a plug in its upper end, a rotatable arm of a specified thickness mounted on said plug above the end of said member at right angles thereto, a plurality of templates positioned in said tubular member with a leg projecting through the slot therein and a fastening member adapted to extend through a hole in one side of said member for each of said templates, said holes being positioned to place the projecting portion of said templates in the exact location of hinge door recesses.

4. A hinge recess gauge comprising a regularly shaped tubular member having a slot down its front side, a plug in its upper end, a rotatable arm of a specified thickness mounted on said plug above the end of said tubular member at right angles thereto, a plurality of templates positioned in said tubular member of a shape to telescope within said member with a leg projecting through the slot therein and a fastening member adapted to extend through a hole in the rear side of said member for each of said templates, said holes being positioned to place the projecting portion of said templates in exact location of hinge door recesses.

5. A hinge recess gauge comprising a regularly shaped tubular member having a slot down its front side, a plug in its upper end, a rotatable arm of a specified thickness mounted on said plug above the end of said tubular member at right angles thereto, a plurality of templates positioned in said tubular member of a shape to telescope within said member with a leg projecting through the slot therein and a fastening member adapted to extend through a hole in the rear side of said member for each of said templates, said holes being positioned to place the projecting portion of said templates in exact location of hinge door recesses, and indicia placed on said member adjacent said holes to indicate the proper hole for different door sizes.

6. A hinge recess gauge comprising a rectangularly shaped tubular member having a slot medially down its front side, a plug in its upper end, a rotatable arm of a specified thickness mounted on said plug above the end of said tubular member at right angles thereto, a plurality of T-shaped templates positioned in said tubular member with a leg projecting through the slot therein and a fastening member adapted to extend through a hole in the rear side of said member for each of said templates, said holes being positioned to place the projecting portion of said templates in exact location of hinge door recesses.

7. A hinge recess gauge comprising a rectangularly shaped tubular member having a slot medially down its front side, a plug in its upper end, a rotatable arm of a specified thickness mounted on said plug above the end of said tubular member at right angles thereto, a plurality of T-shaped templates positioned in said tubular member with a leg projecting through the slot therein and a fastening member adapted to extend through a hole in the rear side of said member for each of said templates, said holes being positioned to place the projecting portion of said templates in exact location of hinge door recesses, and indicia placed on said member adjacent each of said holes to indicate the proper hole for different door sizes.

8. A hinge recess gauge comprising a rectangularly shaped tubular member having a slot medially down its front side, a plug in its upper end, a rotatable arm of a specified thickness mounted on said plug above the end of said tubular member at right angles thereto, a plurality of T-shaped templates positioned in said tubular member with a leg projecting through the slot therein and a fastening member adapted to extend through a hole in the rear side of said member for each of said templates, said holes being positioned to place the projecting portion of said templates in exact location of hinge door recesses, and indicia placed on said member adjacent each of said holes to indicate the proper hole for different door sizes, said T-shaped templates consisting of a length of metal T-member of uniform thickness and a backing block of wood connected thereto by pin members.

HENRY W. SEIGER.